United States Patent [19]
Auer et al.

[11] Patent Number: 5,981,688
[45] Date of Patent: Nov. 9, 1999

[54] CONTINUOUS PREPARATION OF POLYTETRAHYDROFURAN BY A TRANSESTERIFICATION CASCADE WITH SPECIFIC DESTRUCTION OF FOAM

[75] Inventors: Heinz Auer, Neulusseim; Klaus Beiser, Eppelsheim; Jürgen Ciprian, Ludwigshafen; Lothar Franz, Mutterstadt; Wolfgang Franzischka, Frankenthal; Ulrich-Dieter Pessel, Heidelberg; Werner Weinle, Friedelsheim, all of Germany

[73] Assignee: BASF Aktiengesellschaft, Ludwigshafen, Germany

[21] Appl. No.: 09/159,086

[22] Filed: Sep. 23, 1998

[30] Foreign Application Priority Data

Sep. 25, 1997 [DE] Germany .................. 197 42 342

[51] Int. Cl.⁶ .................................................. C08G 63/00
[52] U.S. Cl. ................................ 528/176; 525/411
[58] Field of Search ............................ 528/176; 525/411

[56] References Cited

PUBLICATIONS

Pruckmayer, *Enc. of Chem. Tech.*, Kirk–Othmer 4th Ed., vol. 19, pp. 743–777.

*Primary Examiner*—Terressa Mosley
*Attorney, Agent, or Firm*—Keil & Weinkauf

[57] ABSTRACT

A process for preparing hydroxyl-containing polymers and, in particular, a process for preparing polytetrahydrofuran with terminal hydroxyl groups from the corresponding acyloxy-containing polymers by transesterification with alcohols is carried out continuously in at least one stirred vessel, with the foam produced in the transesterification being fed tangentially to a cylindrical container, preferably a cyclone separator, at an adequate velocity to destroy the foam. The liquid phase which separates out is recycled through a line to the at least one stirred vessel.

This continuous process is preferably carried out in a cascade of stirred vessels, in which each stirred vessel or a subunit of at least two stirred vessels can in each case be coupled to a cylindrical container, preferably in the form of a cyclone separator.

8 Claims, 2 Drawing Sheets

CONTINUOUS PREPARATION OF POLYTETRAHYDROFURAN BY A TRANSESTERIFICATION CASCADE WITH SPECIFIC DESTRUCTION OF FOAM

The invention relates to a process for preparing hydroxyl-containing polymers, in particular for preparing polytetrahydrofuran with terminal hydroxyl groups, from the corresponding acyloxy-containing polymers by transesterification with alcohols, which is carried out continuously in at least one stirred vessel.

Polytetrahydrofuran, referred to hereinafter as PTHF for brevity, is normally prepared from tetrahydrofuran using cationic catalyst systems, resulting in a polytetramethylene ether with various end groups which are determined by the initiator system and the reaction medium. PTHF therefore has the formula $$HO-[(CH_2)_4-O]_n-(CH_2)_4-OH$$

where n is an integer from 1 to about 100 which indicates the molecular weight. The following initiator systems are described in the relevant literature (see, for example, G. Pruckmayer, Encyclopedia of Chemical Technology, Kirk-Othmer, 4th edition, Vol. 19, pages 743–777).

| Initiator system |
| --- |
| $R_3O^+/ML_m^-$ |
| $ML_m = BF_4, SbCl_6, FeCl_4,$ |
| $AlCl_4$ |
| $FSO_3H$ |
| $AlCl_3/CH_3COCl$ |
| $HClO_4/(CH_3CO)_2O$ |
| $SbCl_5/(CH_3CO)_2O$ |
| Sheet silicate catalysts |
| Heteropolyphosphoric acids |

In order to obtain polyethers in which the end groups are hydroxyl groups for the main area of use of PTHF, polyurethane chemistry, it is therefore necessary for the end groups in the initially obtained polymer to be converted into alcohol functionalities by suitable measures.

Various prior art methods have been disclosed for this. One of the commonest methods is represented by the transesterification, initiated by alkaline catalysts, of the acyloxy-containing polymers with lower alcohols. An effective catalyst for the transesterification of polytetrahydrofuran with methanol is known to be sodium methoxide. It is also known that the transesterification can be carried out batchwise and continuously.

However, a considerable problem in the continuous procedure is that the reaction solution foams greatly, which results in the downstream column no longer being able to remove methanol and the methanol/methyl acetate azeotrope owing to the presence of PTHF. The transesterification then takes place in an uncontrolled fashion because considerable amounts of PTHF of varying degree of conversion are driven back so that the transesterification can be carried out only with considerably reduced capacity.

It is an object of the present invention to provide a process for preparing hydroxyl-containing polymers and, in particular, for preparing polytetrahydrofuran with terminal hydroxyl groups from the corresponding acyloxy-containing polymers by transesterification with alcohols, which can be carried out continuously, essentially without interference by foam formation, with a capacity of at least 100% of the nominal capacity.

We have found that this object is achieved by a continuous process which comprises at least one stirred vessel being coupled via a first line to an approximately cylindrical containing to receive foam escaping from the stirred vessel in such a manner that the foam is introduced tangentially into the container at an adequate velocity, the diameter of the container being chosen so that it corresponds approximately 2 to 4 times the diameter of the first line so that the foam is separated into a gaseous and a liquid phase, each of which is removed from the container through a line for the gaseous phase and a line for the liquid phase.

The cylindrical container provided according to the invention has the task of receiving and destroying the foam escaping from the particular stirred vessel. This task can be performed by any type of cylindrical containing into which the foam can be introduced tangentially at an adequate velocity and whose diameter corresponds approximately to 2 to 4 times the diameter of the first line supplying the foam. It is therefore also possible to use, for example, a simple connector with the appropriate dimensions as a cylindrical containing of this type. The destruction of the foam separates it into a gaseous and a liquid phase, which are removed from the container through a line provided for this purpose in each case.

In a preferred embodiment of the process according to the invention, the cylindrical container used for destroying the foam is a cyclone separator which achieves high centrifugal accelerations which effectively separate the foam into a liquid and a gaseous phase. When a cyclone separator of this type is used, these centrifugal forces are generated by the kinetic energy of the flow. It has proven advantageous when using the process according to the invention to introduce the foam at a velocity of approximately 5 to 30 m/s into the cylindrical container or the cyclone separator. The process according to the invention is, however, not restricted to the use of cyclone separators. It is also possible to employ, for example, a cylindrical container in which these centrifugal forces are generated by mechanical energy produced, for example, by rotating plates attached outside the actual cylindrical container.

Although it is possible to operate the process according to the invention with just one stirred vessel, it is expedient, in another embodiment of the invention, for complete conversion of the PTHF to connect a plurality of stirred vessels together in the form of a cascade of vessels. There are several possibilities for combining these stirred vessels with the cylindrical container. Thus, for example, it is possible for all the vessels in the cascade each to be connected by first lines, which are coupled together, to only one cylindrical container. This is because it has emerged that just one cylindrical containing can be sufficient for effective destruction of the foam escaping from a plurality of vessels in a cascade.

However, for better utilization of capacity, it is expedient to couple each of the vessels in the cascade to one cylindrical container by their first line in each case. There is moreover the further possibility of reducing the complexity of the apparatus somewhat and of combining some of the vessels in a cascade to a subunit, in which case each of the subunits is then coupled to one cylindrical container.

It is furthermore possible according to the invention to provide for each line for removing the liquid phase from the particular cylindrical container to return to the at least one stirred vessel. On the one hand, this ensures that the minimum amount of PTHF or PTHF diacetate solution is lost, and on the other hand this makes it possible to achieve complete conversion of the recycled PTHF diacetate. Various combinations are possible for this recycling of the liquid phase from the particular cylindrical container, depending on the number of stirred vessels used and of cylindrical containers used. Thus, for example, if the cascade contains four stirred vessels coupled to one cylindrical container, the liquid phase can be recycled to the first, second or third vessel. The liquid phase is preferably not recycled to the fourth vessel because the degrees of conversion may differ and it is possible to achieve, by recycling to at least the third vessel, a longer residence time and thus better conversion of the PTHF diacetate.

If, for example, four stirred vessels in a cascade are connected together to form two subunits, each subunit being coupled to a cylindrical container, then two cylindrical containers are present for this cascade of vessels, and the liquid phase can be recycled in each case to the first vessel or in each case to the second vessel of each subunit.

If a cylindrical container is provided for each vessel in a cascade, it has proven expedient to recycle the liquid phase to the relevant vessel in each case.

BRIEF DESCRIPTION OF DRAWINGS

The invention is to be described in detail below by means of two exemplary embodiments depicted in the drawing.

Figure 1:
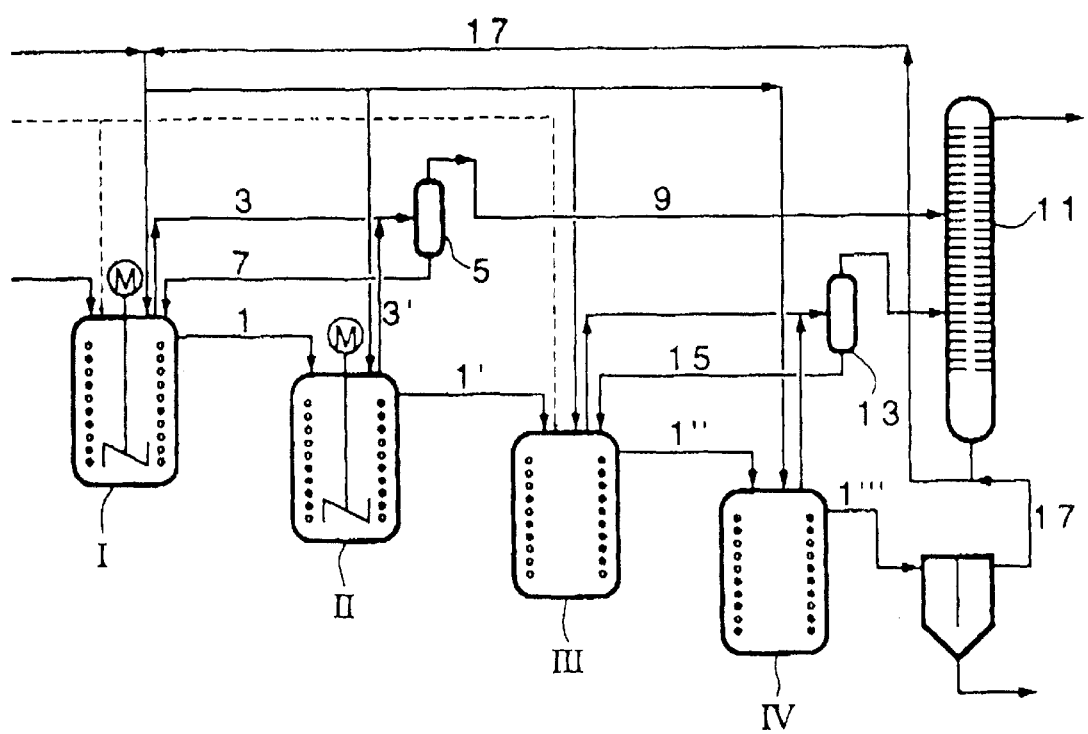
FIG. 1: shows a schematic diagram of PTHF diacetate transesterification with destruction of foam by cyclone separators in a first embodiment of the invention

In the embodiments described below, PTHF diacetate is transesterified using methanol (MeOH) in accordance with the equation known per se:

PTHF-DiAc+2MeOH→PTHF+2MeOAc

In this case, PTHF diacetate (PTHF-DiAc) is fed into a first stirred vessel identified by I in the figures, as are the catalyst and methanol. Sodium methoxide is used as catalyst. Stirred vessel I is connected via a line 1 to a second stirred vessel II. The two stirred vessels I and II have feed lines 3, 3' to a cyclone separator identified by 5. Line 3' is connected to line 3 which then feeds the foam which escapes from these stirred vessels I and II during the transesterification tangentially into the cyclone separator 5. At its lower end, ie. the one facing stirred vessel II in FIG. 1, the cyclone separator 5 has a line 7 for returning the liquid phase formed through the destruction of foam in the cyclone separator 5 to the stirred vessel I. At its opposite, upper end, the cyclone separator 5 has another line 9 which feeds the gaseous phase which has been separated from the liquid phase in the destruction or breaking of the foam to the column 11. The stirred vessels I and II form a subunit according to the invention of the complete cascade of stirred vessels.

Stirred vessel II is connected via a line 1' to another stirred vessel III which in turn is connected via line 1" to a fourth stirred vessel IV in cascade fashion. Vessels III and IV form another subunit in this cascade and are in turn connected to a cyclone separator 13 in the manner described for the first subunit, with the line 15 for recycling the liquid phase from the foam destroyed in the cyclone separator 13 leading not into the last stirred vessel IV but into the preceding stirred vessel III, in order to counteract possible incomplete transesterification by a longer residence time in stirred vessels III and IV.

However, it is also perfectly possible for the lines 7 and 15 for recycling to lead not to vessels I and III but to vessels II and IV respectively. Except for the last stirred vessel IV in the cascade, it is furthermore possible for line 7 for recycling to lead to the next stirred vessel III in the cascade sequence.

The solution emerging from line 1''' from vessel IV is fed to a catalyst remover, which is not depicted in the drawing, and the methanol is recovered and returned through line 17 to the circulation for the continuous process. After the molecular weight has been adjusted, the transesterified PTHF remains as desired reaction product.

It is possible with the continuously operated cascade described in FIG. 1 to achieve utilization of ≦100% of the nominal capacity. An additional advantage is that the downstream column 11 used to remove methanol and the methanol/methyl acetate azeotrope no longer has its separation efficiency reduced by the presence of PTHF diacetate.

Figure 2:
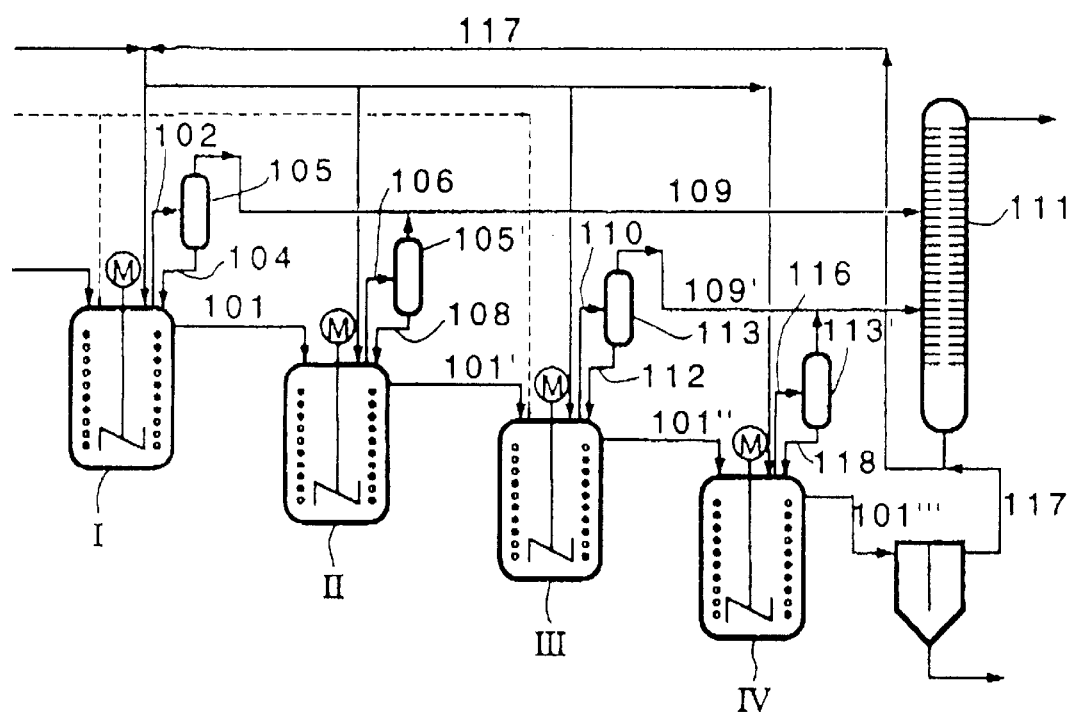
FIG. 2: shows a schematic diagram of a PTHF diacetate transesterification with destruction of foam by cyclone separators in a second embodiment of the invention.

FIG. 2 depicts another embodiment, and only the changes from the first embodiment will be explained below. The reference numbers in this second embodiment therefore correspond, with the addition of 100 in each case, to those in the first embodiment when reference is made to identical or comparable components in the Figure.

The cascade of stirred vessels depicted in FIG. 2 differs from the embodiment depicted in FIG. 1 in that each stirred vessel I to IV has been provided with a cyclone separator 105, 105', 113, 113'. The foam escaping from each of the stirred vessels I to IV is again fed through lines 102, 106, 110, 116 tangentially into the cyclone separator 105, 105', 113, 113', and each of these has a line 104, 108, 112, 118 for returning the liquid phase formed on destruction of the foam to the particular vessel I, II, III, IV to which the cyclone separator is assigned. The line 109, 109' for removing the gaseous phase in each case leads directly to column 111, with, in this case, the lines of the cyclone separators 105, 105' of stirred vessels I and II, and of the cyclone separators 113, 113' of vessels III and IV being coupled together so that 2 lines 109, 109' are present. This mode of operation makes it possible to increase the capacity of the cascade of stirred vessels considerably above 100% of the nominal capacity.

We claim:

1. A continuous process for preparing hydroxyl-containing polymers from the corresponding acyloxy polymers by transesterification with alcohols which is carried out by continuously feeding an acyloxy polymer, an alcohol and a transesterification catalyst into at least one stirred vessel (I), feeding the foam which escapes from said at least one stirred vessel via at least one first connecting line (3) to at least one approximately cylindrical container (5), separating said foam into a gaseous and a liquid phase by introducing said foam into said at least one approximately cylindrical container tangentially at an adequate velocity and wherein the diameter of said at least one approximately cylindrical container has a diameter which is approximately 2 to 4 times the diameter of said at least one first line so that said separating occurs, removing said gaseous phase and said liquid phase from said at least one approximately cylindrical container through at least one line (9) for said gaseous phase and at least one line (7) for said liquid phase, respectively.

2. A process according to claim 1, wherein at least one cyclone separator is used as said at least one cylindrical container (5).

3. A process according to claim 1, wherein said foam is introduced at a velocity of approximately 5 to 30 m/s into said at least one cylindrical container (5).

4. A process according to claim 1, wherein a plurality of said stirred vessels (I, II, III, IV) are connected together in the form of a cascade of vessels and all the vessels (I, II, III, IV) in the cascade are connected by said first lines which are coupled together to only one said cylindrical container.

5. A process according to claim 1, wherein a plurality of said stirred vessels (I, II, III, IV) are connected together in the form of a cascade of vessels, and each of the vessels (I, II, III, IV) in the cascade is coupled in each case by a said first line (102, 106, 110, 116) to one said cylindrical container (105, 105', 113, 113').

6. A process according to claim 1, wherein a plurality of said stirred vessels (I, II, III, IV) are connected together in the form of a cascade of vessels, and some of the vessels (I, II, III, IV) in the cascade form a subunit, each subunit being coupled to one said cylindrical container (5; 13).

7. A process as claimed in claim 1, wherein each said line for removing the liquid phase returns to said at least one stirred vessel (I, III, III, IV).

8. A process as claimed in claim 1 for preparing polytetrahydrofuran with terminal hydroxyl groups.

* * * * *